United States Patent
Paranjpe et al.

(10) Patent No.: US 8,326,614 B2
(45) Date of Patent: Dec. 4, 2012

(54) SPEECH ENHANCEMENT SYSTEM

(75) Inventors: Shreyas Paranjpe, Vancouver (CA);
Phillip A. Hetherington, Port Moody (CA); Xueman Li, Burnaby (CA)

(73) Assignee: QNX Software Systems Limited, Kanata, Ontario (CA)

( * ) Notice: Subject to any disclaimer, the term of this patent is extended or adjusted under 35 U.S.C. 154(b) by 760 days.

(21) Appl. No.: 12/471,072

(22) Filed: May 22, 2009

(65) Prior Publication Data
US 2009/0287481 A1 Nov. 19, 2009

Related U.S. Application Data

(63) Continuation-in-part of application No. 11/218,742, filed on Sep. 2, 2005, now Pat. No. 7,724,693.

(60) Provisional application No. 61/055,651, filed on May 23, 2008, provisional application No. 61/055,859, filed on May 23, 2008.

(51) Int. Cl.
*G10L 19/04* (2006.01)
(52) U.S. Cl. ........................ 704/219; 704/226
(58) Field of Classification Search .................. 704/219, 704/226
See application file for complete search history.

(56) References Cited

U.S. PATENT DOCUMENTS

| | | | |
|---|---|---|---|
| 6,044,068 A | 3/2000 | El Malki | |
| 6,167,375 A * | 12/2000 | Miseki et al. | 704/229 |
| 6,427,135 B1 * | 7/2002 | Miseki et al. | 704/258 |
| 6,493,338 B1 | 12/2002 | Preston et al. | |
| 6,690,681 B1 | 2/2004 | Preston et al. | |
| 6,741,874 B1 | 5/2004 | Novorita et al. | |
| 6,771,629 B1 | 8/2004 | Preston et al. | |
| 6,850,252 B1 * | 2/2005 | Hoffberg | 715/716 |
| 7,142,533 B2 | 11/2006 | Ghobrial et al. | |
| 7,366,161 B2 | 4/2008 | Mitchell et al. | |
| 7,813,822 B1 * | 10/2010 | Hoffberg | 700/94 |
| 7,974,714 B2 * | 7/2011 | Hoffberg | 700/94 |
| 2001/0006511 A1 | 7/2001 | Matt | |
| 2007/0025281 A1 | 2/2007 | McFarland et al. | |
| 2009/0112579 A1 | 4/2009 | Li et al. | |
| 2009/0112584 A1 | 4/2009 | Li et al. | |

OTHER PUBLICATIONS

Ephraim, Yariv et al., "Speech Enhancement Using a Minimum Mean-Square Error Short-Time Spectral Amplitude Estimator," *IEEE Transactions on Acoustics, Speech, and Signal Processing*, vol. ASSP-32, No. 6, Dec. 1984, pp. 1109-1121.

Ephraim, Y. et al., "Speech Enhancement Using a Minimum Mean-Square Error Log-Spectral Amplitude Estimator," *IEEE Transactions on Acoustic, Speech, and Signal Processing*, vol. ASSP-33, No. 2, Apr. 1985, pp. 443-445.

Linhard, Klaus et al., "Spectral Noise Subtraction with Recursive Gain Curves," *Daimler Benz AG, Research and Technology*, Jan. 9, 1998, 4 pages.

* cited by examiner

*Primary Examiner* — Susan McFadden
(74) *Attorney, Agent, or Firm* — Brinks Hofer Gilson & Lione

(57) ABSTRACT

A speech enhancement system improves speech conversion within an encoder and decoder. The system includes a first device that converts sound waves into operational signals. A second device selects a template that represents an expected signal model. The selected template models speech characteristics of the operational signals through a speech codebook that is further accessed in a communication channel.

17 Claims, 3 Drawing Sheets

SPEECH ENHANCEMENT SYSTEM

PRIORITY CLAIM

This application is a continuation-in-part of U.S. application Ser. No. 11/218,742, entitled "Network Dependent Signal Processing" filed Sep. 2, 2005, and claims the benefit of priority from U.S. Provisional Application Ser. No. 61/055,651, entitled "Model Based Speech Enhancement" filed May 23, 2008, and Ser. No. 61/055,859, entitled "Speech Enhancement System" filed May 23, 2008, all of which are incorporated by reference.

BACKGROUND OF THE INVENTION

1. Technical Field

This disclosure relates to a speech enhancement, and more particularly to a speech enhancement that attempts to match a communication path.

2. Related Art

Some speech enhancement systems produce output signals that seem acceptable for direct audition. But some do not match the expected speech models of a succeeding speech encoder or decoder. This mismatch between a speech enhancement system's outputs and the encoder/decoder's (Codec) expected inputs may cause the Codec to encode the signal in a sub-optimal manner. The encoding may generate undesired artifacts such as noise gating and be conveyed as a lower quality speech.

SUMMARY

A speech enhancement system improves speech conversion within an encoder and decoder. The system includes a first device that converts sound waves into operational signals. A second device selects a template that represents an expected signal model. The selected template models speech characteristics of the operational signals through a speech codebook that is further accessed in a communication channel.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawing and descriptions. The components in the figures are not necessarily to scale, emphasis instead being placed upon illustrating the principles of the invention. Moreover, in the figure, like referenced numerals designate corresponding parts throughout the different views.

DETAILED DESCRIPTION OF THE PREFERRED EMBODIMENTS

Some speech communication systems are forced to operate in challenging environments. While users may expect the clarity they are accustomed to hearing in a handheld phone, in hands-free systems, receivers may be positioned away from a speaker which decreases the signal strength of speech to surrounding noises. In vehicles, passing vehicles, wind, rain, powertrain, and entertainment and comfort systems may make it difficult to hear desired speech. To overcome such challenges, a speech enhancement system may combine a network dependent signal processing systems with templates based on spectral shapes accessed in or through a communication channel. In some systems, a slave processor (or back-end processor) may perform the specialized task of providing rapid access to a database or memory retaining the template entries, freeing down channel devices to perform other work. When the closest matching template is identified, it may be selected by the slave processor and transmitted through the communication channel.

Figure 1:
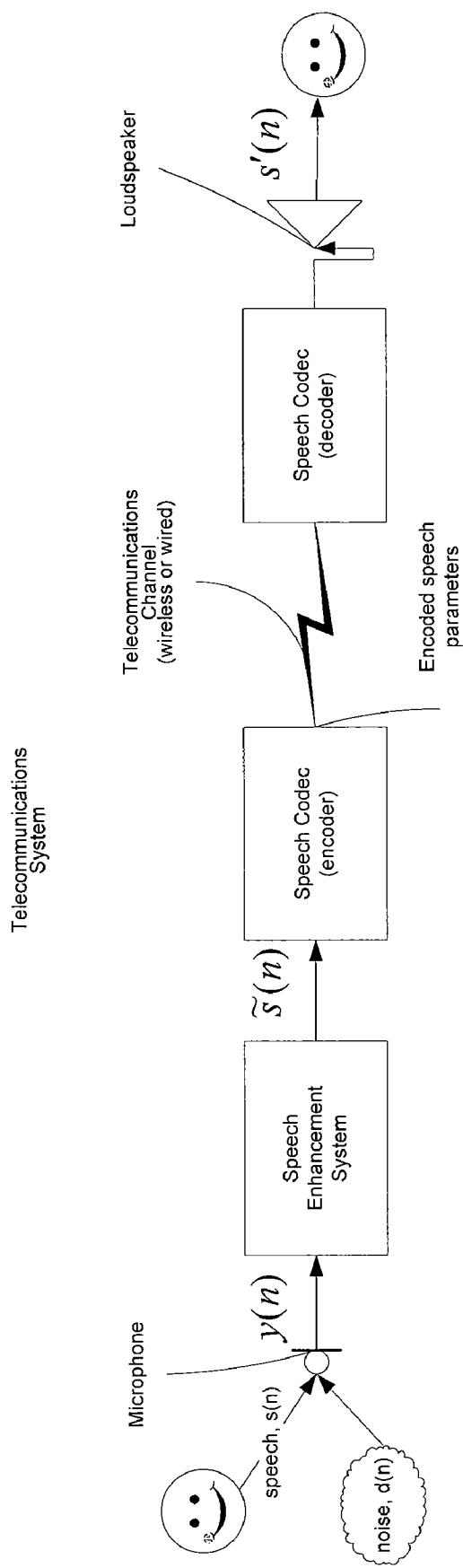
FIG. 1 is a telecommunication system.

A speech enhancement system may share speech models or codebooks with an encoder and a decoder. Through shared codebooks the speech enhancement may work in a complementary manner with the communication channel to enhance a speech exchange or a transfer. Without the shared codebooks, some speech enhancement systems and speech Codecs may perform their respective functions of enhancing a noisy speech signal and encoding/decoding a speech signal without considering the affects of the telecommunications path as shown in FIG. 1. However, the front-end of the telecommunication may be improved by adopting the speech Codec's models. This may allow the speech enhancement to match the encoding and decoding characteristics of the telecommunication channel.

Figure 2:
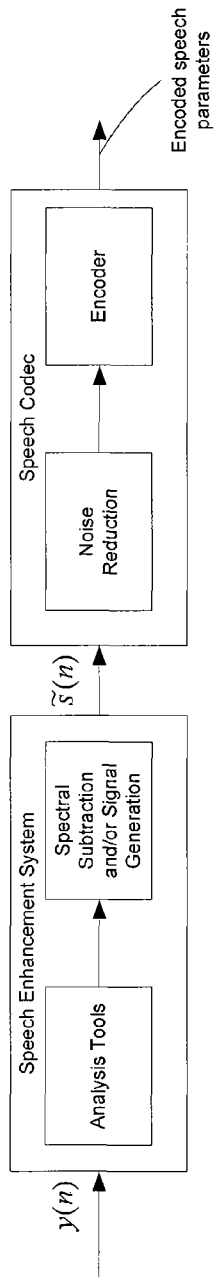
FIG. 2 shows features of some speech enhancement and speech Codec systems.

The enhancement is not limited to a specific encoder or decoder scheme. For example, the enhancement may be integrated with or may be a unitary part of an Enhanced Variable Rate Codec (EVRC), an Enhanced Variable rate Codec Wideband Extension (EVRC-WB), or an Enhanced Variable Rate Codec-B (EVRC-B), for example, that may compress segments of the spectrum into frames (e.g., full rate, half rate, quarter rate, eighth rate) using a fixed or a variable rate coding. Some or all of the Codecs may have or interface a basic noise removal (NR) device (or scheme). It may comprise a preprocessor coupled to the speech encoder. The preprocessor may or may not have a sophisticated analyzer that may be used by more robust speech enhancement technology such as a robust voice activity detector, vowel/consonant identifier, robust pitch detector, and/or other noisy signal analysis devices or elements, as shown in the Speech Enhancement System portion of FIG. 2. Without the speech enhancement, a Codec with NR may not yield a perceptually clear output. When an enhancement is integrated with, coupled to, or a unitary part of a speech Codec, an EVRC, EVRC-WB, EVRC-B with or without NR, may assume that a speech signal is reasonably clean. Its characteristics may not depend on its source (e.g. originating from a near-field microphone, which may be a microphone, is close to the talker's mouth). With the speech enhancement, a Codec may select a spectral shape from its codebooks regardless of the spectrum's signal to noise ratio (SNR). There may be less risk of the speech signal being contaminated by a strong noise signal that may not be effectively removed by a pre-processing noise reduction system. By minimizing this risk, it is less likely that a speech Codec will select an idealized speech spectral envelope to model a noisy signal. By minimizing this type of mismatch between the actual signals presented to the speech Codec and its expected inputs, the speech enhancement may also minimize the occurrence of artifacts such as noise gating and low quality speech.

By incorporating a speech enhancement that adopts a Codec's speech models, a speech enhancement may avoid overly concentrating on producing signals for direct audition, instead of shaping the signal for the speech Codec's expectations. For example, producing a good sounding background noise that is reasonably similar to the microphone's actual acoustic environment may be a desirable feature in a noise reduction system. Including a background noise's spectral shape that includes adaptive and/or fixed speech Codec's codebooks may be further desirable to minimize any mismatches between the speech enhancement system's outputs and the speech Codec's expected inputs. These pre-processing systems may minimize or dampen "noise gating" artifact. In some systems, noise gating artifacts may be blamed on the speech enhancement system for not shaping its outputs properly, or on the speech encoder for not accounting for sufficient real world spectral shapes.

Some speech enhancement systems may use some type of attenuation device such as a spectral subtractor (other systems may use or include one or more adaptive filters, beam-formers, blind signal separation elements, de-correlation elements, de-convolution elements, parametric modelers, perceptual maskers, etc.) to reduce the noisy components of a device that converts sound waves into analog or digital data (e.g., a microphone signal). Some noise reduction systems that reduce intelligibility may reduce voice quality because imperfect estimation techniques that may be avoided when the speech enhancement system adopts one or more of the speech Codec's speech models. These systems may avoid attenuating or substantial removing useful parts of the speech signal. Other enhancement systems (including those identified) may be combined with the speech enhancement. Some may apply signal generation techniques to synthesize missing or weak components of the speech signal. In these systems, a speech reconstruction controller may reconstruct some or all of the low-frequency or attenuated harmonics. In some speech enhancement systems, speech may be reconstructed through the systems and methods disclosed in Ser. No. 12/126,682, entitled "Speech Enhancement Through Partial Speech Reconstruction" filed May 23, 2008, which is incorporated by reference. Alternative systems may minimize the synthetic, "buzzy," or other unnatural sounding artifacts.

By adopting a speech model or an adaptive and/or fixed codebook in the front-end of a speech enhancement, the speech enhancement system may match the expected speech signal models from the speech encoder's perspective. These speech encoders may model the speech signal as some type of voiced, unvoiced, or mixed excitation that is passed through a vocal tract.

Some speech enhancements meld a more robust speech enhancement system to the front end of the speech Codec so that both systems track or are programmed to understand the device capabilities. Through these combinations speech Codecs may be equally concerned with data compression and maintaining a high voice quality for the lowest bit-rates (e.g., low bandwidth). Robustness to noise and other real world conditions and operating environments may be a balanced concern.

Figure 3:
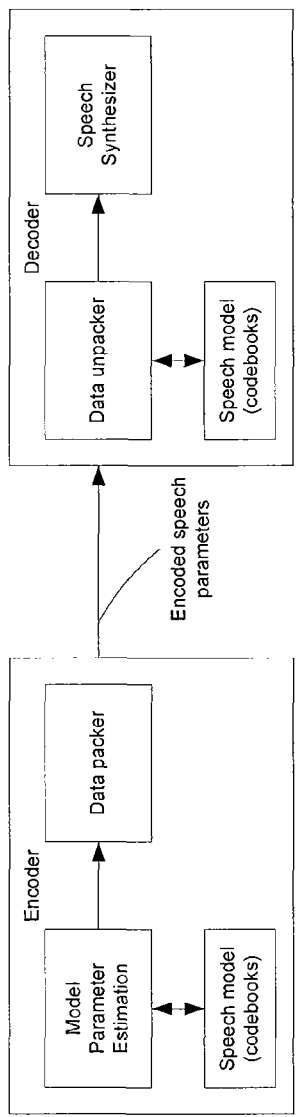
FIG. 3 shows elements of speech encoder and decoder.
Figure 4:
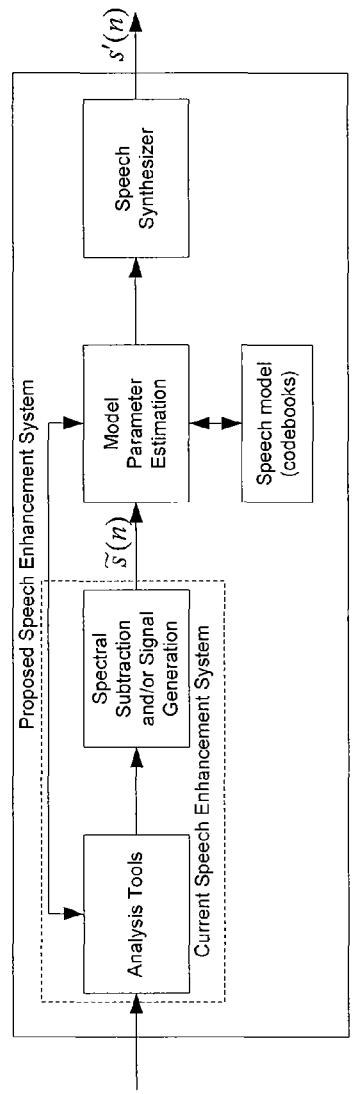
FIG. 4 is a speech enhancement system.

FIG. 3 shows elements of the speech encoder and decoder, including shared codebooks that may include the speech signal models, the model parameter estimation block in the encoder, and a speech synthesizer block in the decoder. When a speech Codec does not include a desired front-end noise removal system, then speech enhancement systems may adopt the speech Codec's speech models to ensure their outputs fit within the speech Codec's expectations. Some systems use the extensive set of noise-robust analysis tools including a voice activity detector, a pitch detector, vowel/consonant detector, and background noise estimator to drive one or more of the main control parameters that may be used in the Codec's speech models as shown in FIG. 4.

Figure 5:
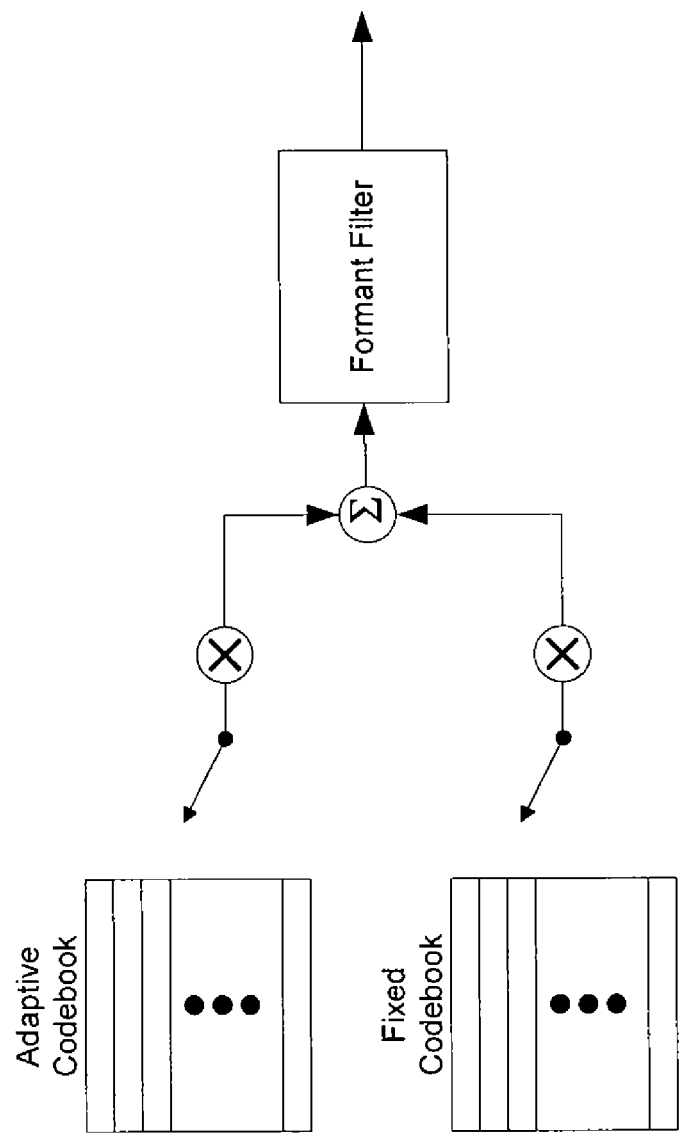
FIG. 5 is a fixed and an adaptive codebook coupled to an adaptive filter.

Some speech Codecs that may be based on Linear Prediction may include Linear Prediction Analysis by Synthesis Codecs such as EVRC, Enhanced Full Rate (EFR), Adaptive Multirate (AMR) and Variable rate Multimode (VMR). Some or all of the speech Codecs may model the speech signal as being generated by a time varying excitation signal that contains a mixture of noisy and periodic components that may then be passed through a time varying formant filter that models the vocal tract (e.g., FIG. 5).

Some speech enhancement systems may use attenuation based noise reduction algorithms, including a spectral subtractor (or any one of the other systems identified above), to reduce background noise and perform some amount of cleaning in and around speech segments. Speech enhancement system analysis tools may be used on the cleaned signal to synthesize a Codec-friendly signal based on the Codec's speech model. The cleaned signal may not necessarily pass directly to the speech Codec.

A cleaned signal may be further analyzed and processed using a similar scheme as the speech encoder. These systems may use information from the speech enhancement system's analyzers to generate a new synthesized speech signal. The speech enhancement system may perform linear prediction analysis to generate its own spectral estimate of the formant frequency shape. In some systems, a formant frequency shape may be compared on an SNR-weighted basis to find the closest matching spectral shape in the speech encoder's spectral shape codebooks. For speech Codecs like the EFR Codec that may not contain explicit spectral shapes, the EVRC Codec's spectral shape codebooks may be a good selection since the devices may share common assumptions about their speech models. An alternative may use an appropriately trained Neural Network to predict the low-SNR regions of the spectral shape based on the high-SNR regions. Some alternative systems may include or interface the systems and methods described in Ser. No. 60/555,582, entitled "Isolating Voice Signals Utilizing Neural Networks" filed Mar. 23, 2004, which is incorporated by reference. Regardless of the spectral shape selection, a best matching spectral shape within the Codec's spectral shape codebooks may be utilized to create the speech enhancement system's output in order to minimize discrepancies with the Codec's expected inputs.

Other alternate systems and methods may include combinations of some or all of the structure and functions described above or shown in one or more or each of the figures. These systems or methods are formed from any combination of structure and function described or illustrated within the figures or incorporated by reference. Some alternative systems are compliant with one or more of the transceiver protocols may communicate with one or communication channel devices. The communication channels may facilitate a communication or a transaction. The connections may provide access to, or transmit, static or dynamic content (live audio or video streams, for example).

When a speech enhancement system has inverse filtered the formant shape, a residual signal that models the possibly mixed noise plus periodic excitation may be created. The spectral enhancement system's noise-robust parameter estimation information may be utilized by a speech encoder's model parameter estimation process. For example, a speech encoder model parameter estimator may determine a pitch period through an autocorrelation device that processes the residual signal. This open loop pitch estimate may be combined with a more robust pitch analysis from the speech enhancement system and may also utilize its voice activity detector and vowel/consonant confidence measures to determine whether searching for a pitch period is appropriate.

By taking advantage of the speech enhancement system's additional analysis information, a more reliable set of speech model parameters may be estimated which may then drive the speech synthesizer coupled to the Codec. A newly synthesized speech signal may be the final cleaned signal produced by the new speech enhancement system and may more closely match the speech encoder's expected inputs because it was generated using the Codec's speech model.

Instead of only cleaning a noisy signal for direct audition, some speech enhancement systems generate a cleaned, newly synthesized speech signal using a similar synthesizer and parameters as the Codec. Some speech enhancement devices adopt the speech Codec's speech models and thereby minimize the discrepancies between the speech enhancement system output and the speech Codec's expected input. The synthesis parameters, including the pitch period, pitch gain, fixed and adaptive codebook shapes and gains, and formant filter shape are all determined with the additional benefit of the more robust estimates from the speech enhancement system including voice activity detection, background noise estimation, pitch detection, and vowel/consonant detection.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A speech enhancement system, comprising:
   a first device that converts sound waves into operational signals; and
   a second device that selects one or more templates from a speech codebook that is shared with a third device that comprises an encoder and decoder, where the one or more templates represent spectral shapes and excitation pulses;
   where the selected one or more templates model speech characteristics of the operational signals.

2. The speech enhancement system of claim 1 further comprising an attenuating device selected from the group consisting of an adaptive filter, a spectral subtractor, a beam-former, a blind signal separation element, a de-correlation element, a de-convolution element, a parametric modeler, or a perceptual masker that processes the operational signal and has an output that affects the selection of the one or more templates of a speech Codec.

3. The speech enhancement system of claim 1 further comprising a speech reconstruction controller in communication with the second device configured to reconstruct some or all of the attenuated harmonics of a speech segment.

4. The speech enhancement system of claim 1 where the first device and the second device comprises a unitary part of an enhanced variable rate Codec.

5. The speech enhancement system of claim 1 further comprising a spectral subtractor that reduces the noise that may distort a perceptual quality of a speech segment.

6. The speech enhancement system of claim 1 further comprising a switched beam beamformer in communication with the first device that combines signals received from a plurality of sensors that comprise an input array.

7. The speech enhancement system of claim 1 further comprising an adaptive beamformer in communication with the first device that automatically adapts to signals received from a plurality of sensors that comprise an input array.

8. The speech enhancement system of claim 1 further comprising an adaptive filter in communication with the first device that is configured to self-adjust its transfer function based on noise segments in the operational signals.

9. The speech enhancement system of claim 1 further comprising a blind source separator device in communication with the first device that is configured to separate a set of noisy segments from speech segments within the operational signals without the aid of information about the operational signals.

10. The speech enhancement system of claim 1 further comprising a blind source separator in communication with the first device configured to separate a set of noisy segments from the speech segments within the operational signals without the aid of information about the operating characteristics of the first device.

11. The speech enhancement system of claim 1 further comprising a perceptual masking device that substantially eliminates or minimizes noise.

12. The speech enhancement system of claim 1 further comprising a decorrelation device in communication with the first device configured to reduce the correlation between speech segments and noise segments within the operational signals.

13. The speech enhancement system of claim 1 further comprising a deconvolution device in communication with the first device configured to reduce the correlation between speech segments and noise segments within the operational signals.

14. The speech enhancement system of claim 1 further comprising a parametric modeling device in communication with the first device configured to generate dimensional parameters of each of a plurality of noisy segments within the operational signals.

15. A speech enhancement system, comprising:
    a first device that converts sound waves into operational signals; and
    a slave processor in communication with the first device that selects a template that represents an expected signal model from a database based on characteristics of the operational signals;
    where the selected template models speech characteristics of the operational signals based on a speech codebook that is further accessed in a communication channel downstream of the first device; and
    where the slave processor is subordinate to a controller resident to a Codec in the communication channel.

16. The speech enhancement system of claim 15 further comprising a blind source separator device in communication with the first device that is configured to separate a set of noisy segments from speech segments within the operational signals without the aid of information about the operational signals.

17. The speech enhancement system of claim 15 further comprising a deconvolution device in communication with the first device configured to reduce the correlation between speech segments and noise segments within the operational signals.

* * * * *